United States Patent
Kokkonen et al.

(10) Patent No.: US 10,117,165 B2
(45) Date of Patent: Oct. 30, 2018

(54) MANAGEMENT OF MULTIPLE SUBSCRIBER IDENTITY MODULES

(71) Applicant: UROS OY, Oulu (FI)

(72) Inventors: Jari Kokkonen, Oulu (FI); Marko Nousiainen, Oulu (FI); Ilkka Rahikainen, Oulu (FI); Tommi Uhari, Oulu (FI)

(73) Assignee: UROS TECHNOLOGY S.À R.L., Ettelbruck (LU)

( * ) Notice: Subject to any disclaimer, the term of this patent is extended or adjusted under 35 U.S.C. 154(b) by 376 days.

(21) Appl. No.: 13/739,479

(22) Filed: Jan. 11, 2013

(65) Prior Publication Data
US 2013/0190051 A1    Jul. 25, 2013

(30) Foreign Application Priority Data

Jan. 20, 2012 (EP) .................................... 12151906

(51) Int. Cl.
  *H04Q 7/10*   (2006.01)
  *H04W 48/18*  (2009.01)
  *H04W 8/22*   (2009.01)
  *H04W 4/16*   (2009.01)
  *H04W 8/18*   (2009.01)
  *H04B 1/3816* (2015.01)

(52) U.S. Cl.
  CPC .......... *H04W 48/18* (2013.01); *H04B 1/3816* (2013.01); *H04W 4/16* (2013.01); *H04W 8/18* (2013.01); *H04W 8/22* (2013.01); *H04M 2250/14* (2013.01); *H04M 2250/66* (2013.01)

(58) Field of Classification Search
  CPC ....... H04W 8/183; H04W 76/02; H04W 8/24; H04W 48/18; H04M 2250/66
  USPC .................................. 455/558, 420, 551, 411
  See application file for complete search history.

(56) References Cited

U.S. PATENT DOCUMENTS 5,987,325 A    11/1999  Tayloe
6,178,335 B1 *  1/2001  Vu ................................ 455/558
(Continued)

FOREIGN PATENT DOCUMENTS

DE    20 2010 005 832 U1    9/2010

OTHER PUBLICATIONS

May 31, 2012 European Search Report issued in European Patent Application No. EP 12 15 1906.
(Continued)

*Primary Examiner* — Patrick Edouard
*Assistant Examiner* — Julio Perez
(74) *Attorney, Agent, or Firm* — Oliff PLC (57) ABSTRACT

Management of multiple subscriber identity modules is disclosed. An apparatus includes an interface to a set of subscriber identity modules of a wireless communication system; one or more processors, and one or more memories storing instructions, that, when executed by the one or more processors, cause the apparatus to: obtain data relating to the subscriber identity modules through the interface; obtain data relating to a mobile terminal; obtain at least one selection ground for the subscriber identity module; and select at least one optimal subscriber identity module for use by the mobile terminal on the basis of the data relating to the subscriber identity modules, the data relating to the mobile terminal, and the at least one selection ground for the subscriber identity module.

17 Claims, 8 Drawing Sheets

(56) References Cited

U.S. PATENT DOCUMENTS

| | | | |
|---|---|---|---|
| 6,366,777 B1* | 4/2002 | Uusitalo | 455/433 |
| 8,238,973 B2* | 8/2012 | Kurz | H04L 63/0492 455/410 |
| 8,478,341 B2* | 7/2013 | Torres | 455/558 |
| 8,688,167 B2* | 4/2014 | Joppek | H04M 1/24 455/551 |
| 8,965,363 B1 | 2/2015 | Umamaheswaran et al. | |
| 2007/0259691 A1 | 11/2007 | Santos Garcia | |
| 2009/0186651 A1 | 7/2009 | You | |
| 2010/0279698 A1* | 11/2010 | Wong | 455/450 |
| 2011/0151832 A1 | 6/2011 | Lai | |
| 2011/0269423 A1* | 11/2011 | Schell | H04L 63/062 455/411 |
| 2012/0196569 A1* | 8/2012 | Holtmanns et al. | 455/411 |
| 2012/0302284 A1* | 11/2012 | Rishy-Maharaj et al. | 455/552.1 |
| 2013/0023235 A1* | 1/2013 | Fan et al. | 455/411 |
| 2013/0288748 A1 | 10/2013 | Korkiakoski et al. | |
| 2015/0256993 A1 | 9/2015 | Bellamkonda et al. | |

OTHER PUBLICATIONS

Aug. 18, 2014 Office Action issued in European Patent Application No. 12 151 906.0.
Mar. 30, 2017 Office Action issued in U.S. Appl. No. 14/730,636.
Feb. 10, 2017 Office Action issued in U.S. Appl. No. 14/730,862.
Sep. 18, 2017 Office Action issued in U.S. Appl. No. 14/730,862.
Mar. 9, 2018 Office Action issued in U.S. Appl. No. 14/730,862.

* cited by examiner

MANAGEMENT OF MULTIPLE SUBSCRIBER IDENTITY MODULES

FIELD

The invention relates to management of multiple subscriber identity modules.

BACKGROUND

Mobile phones with dual or triple subscriber identity modules (SIM) are well-known. The selection of the active SIM is done manually using a selector switch, or by manually selecting from a menu using menu buttons of the user interface, or by manipulating controls on a touch-screen.

BRIEF DESCRIPTION

According to an aspect of the present invention, there is provided an apparatus comprising: an interface to a set of subscriber identity modules of a wireless communication system; one or more processors, and one or more memories storing instructions, that, when executed by the one or more processors, cause the apparatus to: obtain data relating to the subscriber identity modules through the interface; obtain data relating to a mobile terminal; obtain at least one selection ground for the subscriber identity module; and select at least one optimal subscriber identity module for use by the mobile terminal on the basis of the data relating to the subscriber identity modules, the data relating to the mobile terminal, and the at least one selection ground for the subscriber identity module.

According to another aspect of the present invention, there is provided a method comprising: obtaining data relating to subscriber identity modules of a wireless communication system; obtaining data relating to a mobile terminal; obtaining at least one selection ground for the subscriber identity module; and selecting at least one optimal subscriber identity module for use by the mobile terminal on the basis of the data relating to the subscriber identity modules, the data relating to the mobile terminal, and the at least one selection ground for the subscriber identity module.

According to another aspect of the present invention, there is provided a computer program on a non-transitory computer-readable storage medium comprising instructions which, when loaded into an apparatus, cause the apparatus to perform the process of: obtaining data relating to subscriber identity modules of a wireless communication system; obtaining data relating to a mobile terminal; obtaining at least one selection ground for the subscriber identity module; and selecting at least one optimal subscriber identity module for use by the mobile terminal on the basis of the data relating to the subscriber identity modules, the data relating to the mobile terminal, and the at least one selection ground for the subscriber identity module.

LIST OF DRAWINGS

Example embodiments of the present invention are described below, by way of example only, with reference to the accompanying drawings, in which.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

It should be noted that while FIGS. 1 to 6 illustrate various embodiments of apparatuses, they are simplified block diagrams that only show some structures and functional entities. The connections shown in these Figures are logical connections; the actual physical connections may be different. Interfaces between the various elements may be implemented with suitable interface technologies, such as a message interface, a method interface, a sub-routine call interface, a block interface, or any hardware/software means enabling communication between functional sub-units. It is apparent to a person skilled in the art that the described apparatuses may also comprise other functions and structures. It should be appreciated that details of some functions, structures, and the protocols used for communication are irrelevant to the actual invention. Therefore, they need not be discussed in more detail here. Although the apparatuses have been depicted as separate single entities, different parts may be implemented in one or more physical or logical entities.

Figure 1:
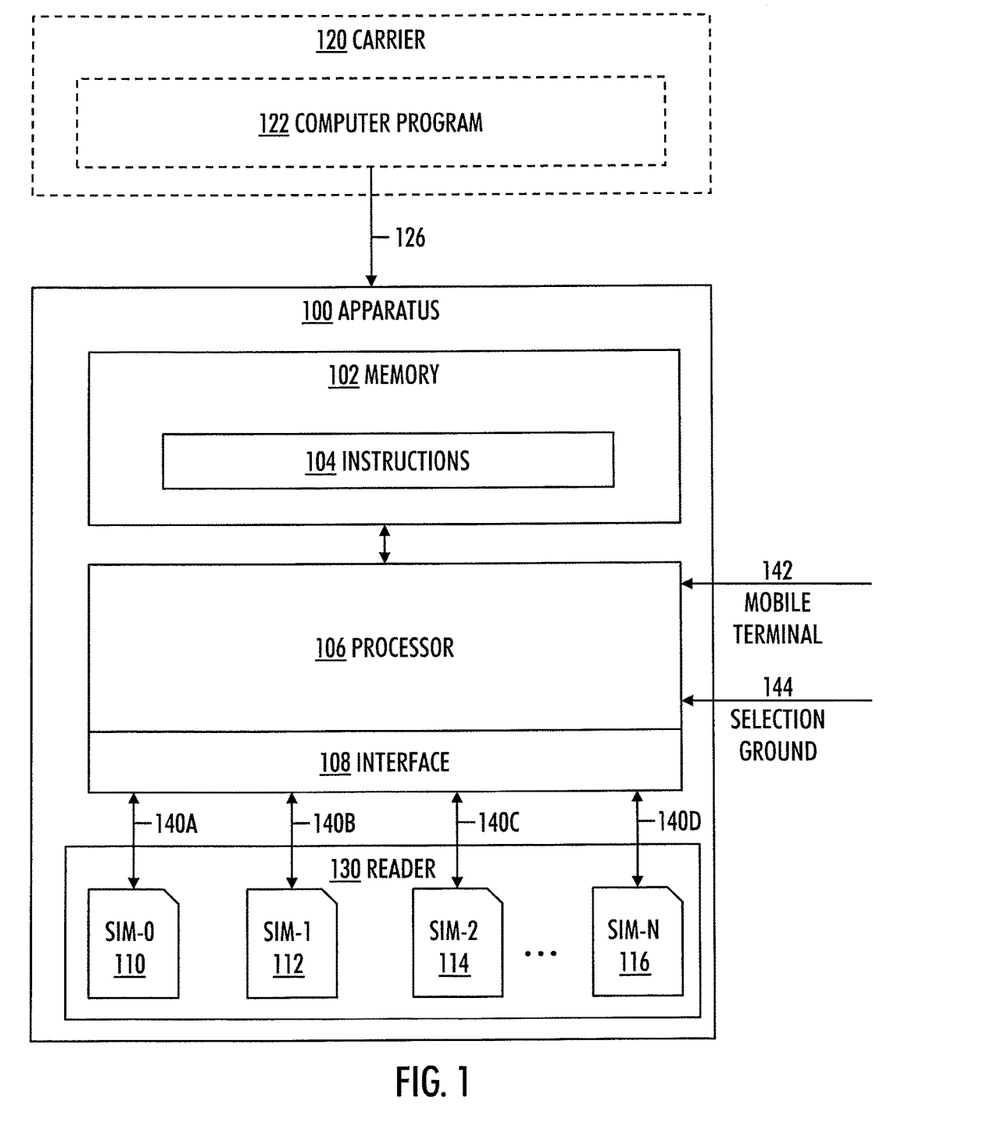
FIGS. 1, 2, 3, 4, 5 and 6 illustrate example embodiments of an apparatus.

As shown in FIG. 1, an apparatus 100 comprises an interface 108 to a set of subscriber identity (SIM) modules 110, 112, 114, 116 of a wireless communication system. The interface 108 may or may not include a (contact) smart card reader 130 capable of reading the subscriber data through the contacts of the integrated circuit.

The number of the subscriber identity modules 110, 112, 114, 116 may vary according to the circumstances, but there are at least three subscriber identity modules. One subscriber identity module 110 may be a default subscriber identity module used normally (in user's home location or in a network where he/she has the coverage of the default subscriber identity module, for example). The number of other subscriber identity modules 112, 114, 116 may vary between 2 to N, wherein N is an integer greater than two, whereby the minimum number of the subscriber identity modules (0, 1, 2, . . . , N) is three.

In an example embodiment, the subscriber identity module 110, 112, 114, 116 is an integrated circuit storing subscriber data, which is network-specific information used to authenticate and identify subscribers on the network. The subscriber identity module may be embedded into a removable SIM card. First SIM cards were of credit card size, 85.60 mm×53.98 mm×0.76 mm, but a newer mini-SIM card is considerably smaller, 25 mm×15 mm×0.76 mm, or a micro-SIM card is even smaller, 15 mm×12 mm×0.76 mm. Naturally, these measures are only example embodiments. It is also to be noted than one physical SIM card may include a number of different subscriptions: one SIM card may be a multi-IMSI SIM card having many different subscriber identities in the same card.

Even a virtual subscriber identity module is feasible: it is a mobile phone number provided by a mobile network operator that does not require a SIM card to connect phone calls to the user's mobile terminal. In such a scenario, the at least one memory 102 of the apparatus 100 may be used to store subscriber data of the virtual subscriber identity module as required.

The wireless communication system may be any standard/non-standard/proprietary radio system that supports the use of the subscriber identity modules 110, 112, 114, 116. In the present, such a system may be any mobile telephone system, regardless of the generation (such as 2G, 3G, 4G, beyond 4G, etc.). Consequently, the wireless communication system may be GSM (Global System for Mobile Communications), WCDMA (Wideband Code Division Multiple Access), TD-SCDMA (Time Division Synchronous Code Division Multiple Access), or evolved universal terrestrial radio access (E-UTRA), also known as long term evolution (LTE) for example, or its recent LTE-Advanced versions (LTE-A). However, the example embodiments are not restricted thereto, but may be applicable to other suitable radio systems (in their present forms and/or in their evolution forms), such as universal mobile telecommunications system (UMTS) radio access network (UTRAN or EUTRAN), a system based on International Mobile Telecommunication (IMT) standard or any one of its evolution versions (e.g. IMT-Advanced), wireless local area network (WLAN) based on IEEE (Institute of Electrical and Electronics Engineers) 802.11 standard or its evolution versions (IEEE 802.11ac), worldwide interoperability for microwave access (WiMAX), Wi-Fi, 3GPP, Bluetooth®, or personal communications services (PCS).

Figure 7:
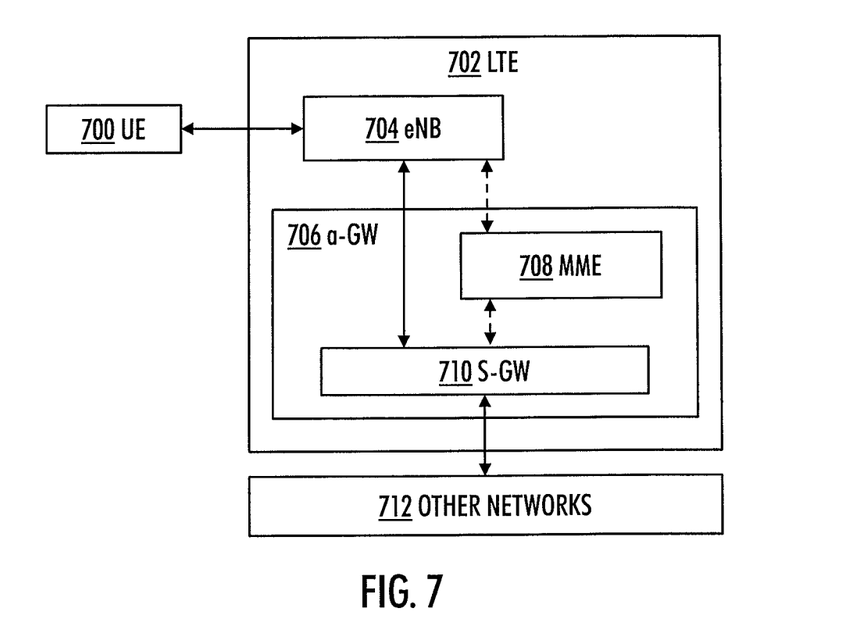
FIG. 7 illustrates an example embodiment of a wireless communication system.

FIG. 7 illustrates an example of the radio system 702, LTE. The three basic elements of the radio system 702 are UE 700 (=mobile terminal), eNB (=base station) 704 in a radio network and an access gateway (a-GW) 706 in a core network. In such a division, the apparatus 100 is either in the UE 700 or coupled to it, but not in the eNB 704 nor in the a-GW 706.

The base station may be called, depending on the system, a Node B, enhanced or evolved NodeB (eNB), a home eNode B (HeNB), an access point (AP), an IEEE 802.11 based access point, a femto node, a femto base station, or any other equipment belonging to the network infrastructure of the wireless communication system, and implementing the radio communication interface with the mobile terminal. Functionalities of the eNB 704 may include: all radio protocols, mobility management, all retransmissions, header compression, and packet data convergence protocols. The a-GW 706 provides the interface of the cellular radio system 702 to/from the other networks 712 such as the Internet. The a-GW 706 may be streamlined by separating the user and the control planes: a mobility management entity (MME) 708 is just a control plane entity and the user plane bypasses MME 708 directly to a serving gateway (S-GW) 710.

The apparatus 100 also comprises one or more processors 106, and one or more memories 102 storing instructions 104. The instructions 104, when executed by the one or more processors 106, cause the apparatus 100 to obtain data 140A, 140B, 140C, 140D relating to the subscriber identity modules 110, 112, 114, 116, obtain data 142 relating to a mobile terminal, obtain at least one selection ground 144 for the subscriber identity module, and select at least one optimal subscriber identity module 110, 112, 114, 116 for use by the mobile terminal on the basis of the data 140A, 140B, 140C, 140D relating to the subscriber identity modules, the data 142 relating to the mobile terminal, and the at least one selection ground 144 for the subscriber identity module. With this kind of processing, utilization of many and wide range of subscriber identity modules becomes possible, and, furthermore, selection of the right subscriber identity module becomes user friendly and automatic (or at least semi-automatic if user interaction is required for the selection or its confirmation).

The term 'processor' 106 refers to a device that is capable of processing data. Depending on the processing power needed, the apparatus 100 may comprise several processors 106 such as parallel processors or a multicore processor. When designing the implementation of the processor 106, a person skilled in the art will consider the requirements set for the size and power consumption of the apparatus 100, the necessary processing capacity, production costs, and production volumes, for example. The processor 106 and the memory 102 may be implemented by an electronic circuitry. In an example embodiment, the processor 106 is Freescale™ i.MX233 applications processor such as MCIMX233CJM4C and the memory 102 includes NAND type flash memory such as Micron® MT29F1G08ABADAH4-IT:D, and mobile DDR (=type of double data rate synchronous DRAM) SDRAM such as Micron® MT46H32M16LFBF-6 IT:C.

A non-exhaustive list of implementation techniques for the processor 106 and the memory 102 includes, but is not limited to:
  logic components,
  standard integrated circuits,
  application-specific integrated circuits (ASIC),
  system-on-a-chip (SoC),
  application-specific standard products (ASSP),
  microprocessors,
  digital signal processors,
  special-purpose computer chips, and
  field-programmable gate arrays (FPGA).

The instructions 104 may be implemented by software and/or hardware. In an example embodiment, the software may be written by a suitable programming language (such as C, C++, or Java), and the resulting executable instructions 104 may be stored on the memory 102 and run by the microprocessor 106. In an example embodiment, the functionality of the hardware may be designed by a suitable hardware description language (such as Verilog or VHDL), and transformed into a gate-level netlist (describing standard cells and the electrical connections between them), and after further phases the chip implementing the processor 106, memory 102 and the instructions 104 may be fabricated with photo masks describing the circuitry.

In an example embodiment, the one or more memories 102 may further store instructions 104, that, when executed by the one or more processors 106, cause the apparatus 100 to obtain the data relating to the subscriber identity modules 110, 112, 114, 116 by at least one of the following: read the data 140A, 140B, 140C, 140D from the subscriber identity modules 110, 112, 114, 116, receive the data 140A, 140B, 140C, 140D wirelessly from a service provider, receive the data 140A, 140B, 140C, 140D from a user interface manipulated by a user of a mobile terminal.

The data 140A, 140B, 140C, 140D relating to the subscriber identity modules 110, 112, 114, 116 may include, for example, a unique serial number (Integrated Circuit Card Identifier, ICCID) of the SIM card, internationally unique number of the subscriber (International Mobile Subscriber Identity, IMSI), security authentication and ciphering information for the subscriber (such as an authentication key Ki), temporary information related to the local network, a list of the services the subscriber has access to, an operator-specific emergency number, two passwords (personal identification number, PIN, for ordinary use, and PIN unlock code, PUK, for PIN unlocking), and other required data. The subscriber data may also include other carrier-specific data such as the short message service centre (SMSC) number, service provider name (SPN), service dialing numbers (SDN), advice-of-charge parameters, and value added service (VAS) applications. Further information may be found in the GSM Technical Specification 11.11.

Besides being called subscriber identity module, also other names and abbreviations may be used to refer to subscriptions. USIM (Universal Subscriber Identity Module) is an application for UMTS running on a UICC (Universal Integrated Circuit Card). The USIM is a logical entity on the physical card storing user subscriber information, authentication information, text messages, and phone book contacts. For authentication purposes, the USIM stores a long-term pre-shared secret key, which is shared with the Authentication Center (AuC) in the network. The USIM also verifies a sequence number that must be within a range using a window mechanism to avoid replay attacks, and is in charge of generating the session keys to be used in the confidentiality and integrity algorithms of the KASUMI block cipher in UMTS. The equivalent of USIM on CDMA networks is CSIM.

The service provider is not illustrated in FIG. 1, but the service provider may be an independent supplier/vendor of the subscriber identity modules 112, 114, 116 and the apparatus 100. The user interface manipulated by the user of the mobile terminal may be a user interface of the mobile terminal.

In an example embodiment, the one or more memories 102 further store instructions 104, that, when executed by the one or more processors 106, cause the apparatus 100 to obtain the data 142 relating to the mobile terminal by obtaining location of the mobile terminal, country code from the mobile terminal, pre-set parameters from the mobile terminal, time from the mobile terminal, date from the mobile terminal, day of the week from the mobile terminal, information of available operators from the mobile terminal, information of available networks from the mobile terminal, obtain type (laptop, mobile phone, tablet, etc.) of the mobile terminal, obtain model (Nokia® N9, Samsung® Galaxy, Apple® iPhone 4, etc.) of the mobile terminal, obtain info about applications (games, email, Skype™, etc.) in use or used in the mobile terminal, and/or other suitable pre-set parameters.

Location of the mobile terminal may be obtained by use of a satellite navigation receiver, for example, as will be described with reference to FIG. 2, but also from cellular location based info. Time, date, and day of the week may be obtained from a watch/calendar application of the mobile terminal, and such information may be relevant when deciding which subscriber identity module 110/112/114/116 to use as the charges may vary according to the time of day, day of the week, or also during special holidays. Information relating to the available operators and available networks may be obtained from an appropriate application of the mobile terminal as the mobile terminal may listen to certain frequencies, and such information may also be relevant for deciding the right subscriber identity module 110/112/114/116 for use as the user may have some preferences relating to the operator, and also the type of the network may affect the decision. The type of the network, for example, may set limits to the data transfer rate, and depending on the user's requirements, a high enough data transfer rate may be desirable.

Each location area of a public land mobile network (PLMN) has its own unique identifier which is known as Location Area Identity (LAI). This internationally unique identifier is used for location updating of mobile subscribers. It is composed of a three decimal digit Mobile Country Code (MCC), a two to three digit Mobile Network Code (MNC) that identifies the GSM PLMN in that country, and a Location Area Code (LAC) which is a 16-bit number thereby allowing 65536 location areas within one GSM PLMN.

In an example embodiment, the one or more memories 102 further store instructions 104, that, when executed by the one or more processors 106, cause the apparatus 100 to obtain the at least one selection ground 144 for the subscriber identity module by obtaining network coverage criterion, available services criterion, quality of service criterion, costs of using the subscriber identity module criterion, location of the mobile terminal criterion.

The various criteria may be used alone or in combination. A simple selection ground 144 could be formulated as follows: "use the cheapest subscriber identity module 110/112/114/116 that provides the required service at the required quality of service in the present location of the mobile terminal by network operator A if available, and if operator A is not available then by any other operator fulfilling the criteria", but this is only an example embodiment, as the selection ground 144 may be made much simpler but also much more complex.

Figure 9:
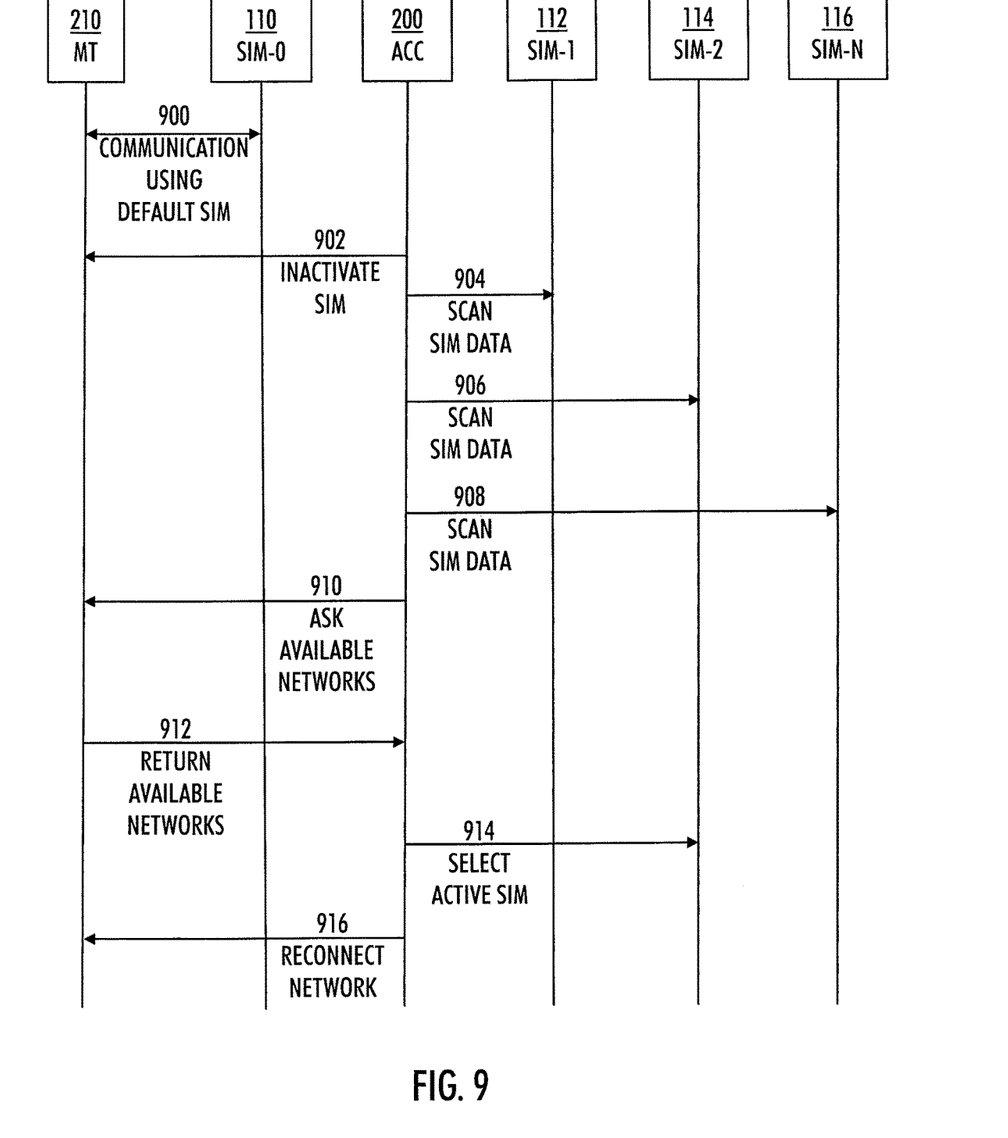
FIG. 9 is a signal sequence chart of some example embodiments.

FIG. 9 is a signal sequence chart of some example embodiments.

In an example embodiment, the one or more memories 102 further store instructions 104, that, when executed by the one or more processors 106, cause the apparatus 100 to treat one of the subscriber identity modules 110 as the default subscriber identity module and to use the default subscriber identity module 110 after start-up of the mobile terminal. The default subscriber identity module 110 may, besides being the starting subscriber identity module, be also the controlling subscriber identity module, and possibly also the back-up subscriber identity module. In FIG. 9, the mobile terminal 210 uses 900 the default SIM 110 for communication.

In an example embodiment, the one or more memories 102 further store instructions 104, that, when executed by the one or more processors 106, cause the apparatus 100 to detect roaming of the mobile terminal, and to initiate said selection of the at least one optimal subscriber identity module 112/114/116 for use by the mobile terminal. Roaming is the ability for a cellular customer to automatically make and receive voice calls, send and receive data, or access other services when travelling outside the geographical coverage area of the home network, by means of using a visited network. Roaming is technically supported by mobility management, authentication and billing procedures. If the visited network is in the same country as the home network, this is known as National Roaming. If the visited network is outside the home country, this is known as International (or Global) Roaming. If the visited network operates on a different technical standard than the home network, this is known as Inter-standard roaming. GSM Coverage Maps is a unique resource containing information supplied and approved by the members of the GSM Association. Network, services and roaming information are continually updated to reflect the evolving situation worldwide. In FIG. 9, the accessory 200 inactivates 902 the mobile terminal 210, and scans 904, 906, 908 SIM data from the set of available subscriber identity modules 112, 114, 116 that are located in the accessory 200. Next, the accessory 200 asks 910 available networks from the mobile terminal 210, whereupon the mobile terminal 210 returns 912 the available networks to the accessory 200. The accessory 200 then selects 914 at least one optimal subscriber identity module 112, 114, 116 for use by the mobile terminal as the active SIM on the basis of the data 904, 906, 908 relating to the subscriber identity modules 112, 114, 116, the data 912 relating to the mobile terminal 210, and the at least one selection ground for the subscriber identity module. In our example, SIM-2 114 is selected 914 as the active SIM, whereupon the accessory 200 instructs 916 the mobile terminal 210 to reconnect network with the optimal active subscriber identity module 114.

In an example embodiment, the one or more memories 102 further store instructions 104, that, when executed by the one or more processors 106, cause the apparatus 100 to detect if the default subscriber identity module 110 is taken out of the use and instead at least one more optimal subscriber identity module 112/114/116 is taken into use, in which case the apparatus 100 is caused to switch on a call forwarding from the default subscriber identity module 110 to one of the more optimal subscriber identity modules 112/114/116 taken into use. With such call forwarding (or diversion) an incoming call to the default subscriber identity module 110 that is not currently in use is redirected to the currently used, more optimal subscriber identity module 112/114/116.

In an example embodiment, the one or more memories 102 further store instructions 104, that, when executed by the one or more processors 106, cause the apparatus 100 to perform said selection of the at least one optimal subscriber identity module 112/114/116 for use by the mobile terminal in two stages, by pre-selecting subscriber identity modules that are usable on the basis of the data 140A, 140B, 140C, 140D relating to the subscriber identity modules and the data 142 relating to the mobile terminal, and by selecting at least one subscriber identity module for use by the mobile terminal from among the pre-selected subscriber identity modules on the basis of the at least one selection ground 144. With this kind of two-stage selection, processing may become simpler, as the pre-selection removes unfeasible subscriber identity modules, whereupon the final selection may be made among a smaller set of subscriber identity modules.

In an example embodiment, the apparatus 100 may be a mobile wireless communications terminal, an accessory of a mobile wireless communications terminal, a combination of a mobile wireless communications terminal and an accessory of the mobile wireless communications terminal, an accessory of a mobile terminal, a combination of a mobile terminal and an accessory of the mobile terminal, or a USB (Universal Serial Bus) modem, or any other suitable mobile terminal capable of employing the set of subscriber identity modules 110, 112, 114, 116, such as a mobile phone, a tablet pc, a portable computer, or a computer. In an example embodiment, the apparatus 100 is a part of a mobile base station, which may employ 3G such as Wi-Fi, for example.

However, in an example embodiment, the apparatus 100 may also be interpreted as a circuitry implementing the required functionality within some suitable equipment. If the apparatus 100 is an independent apparatus, then it may also comprise equipment needed for other tasks as well. On the other hand, if the apparatus 100 is the circuitry, then it may only comprise the processor 106, the memory 102, the instructions 104, and the interface 108.

Various example embodiments will be explained with reference to FIGS. 2, 3, 4, 5 and 6.

Figure 6:
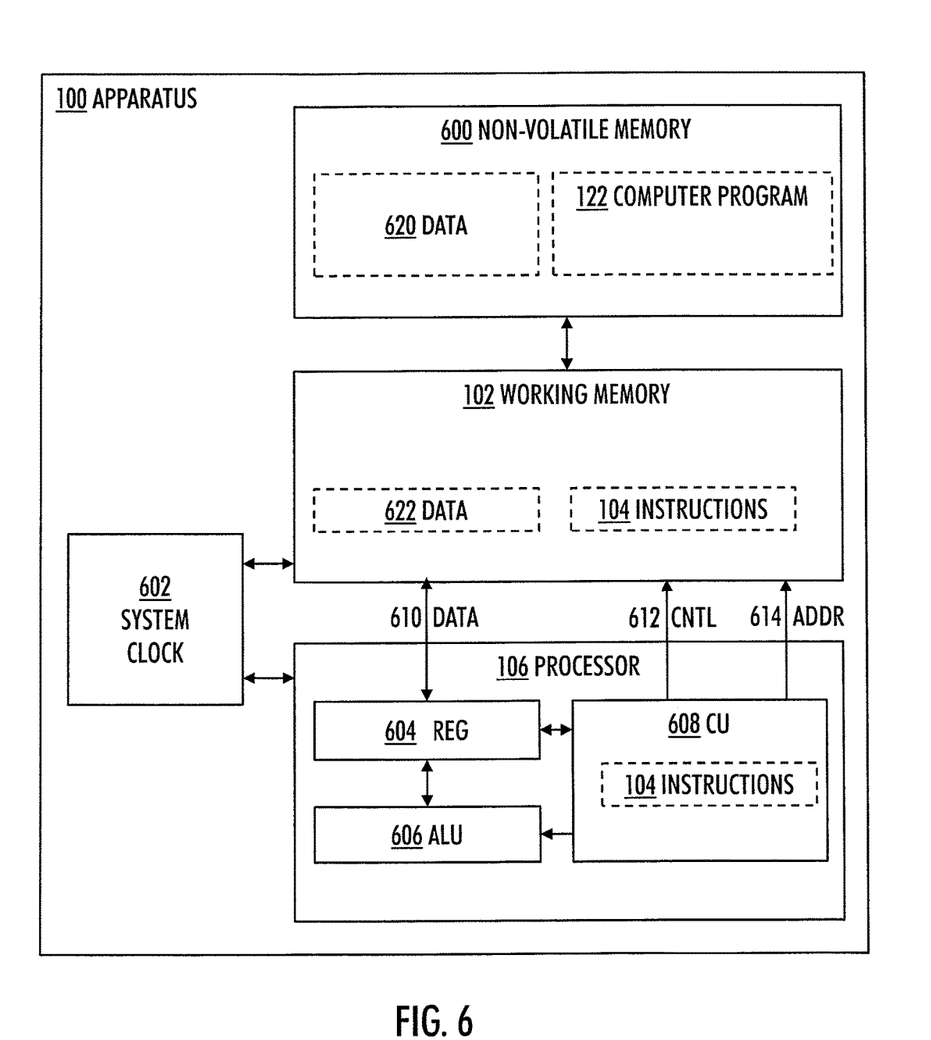

In an example embodiment illustrated in FIG. 6, the apparatus 100 may be an electronic digital computer, which may comprise, besides the processor 106 and the (working) memory 102, a non-volatile memory 600, and a system clock 602. Naturally, the computer may comprise a number of other peripheral devices, not illustrated here for the sake of clarity.

In an example embodiment, the system clock 602 constantly generates a stream of electrical pulses, which cause the various transferring operations within the computer to take place in an orderly manner and with specific timing.

In an example embodiment, the processor 106 may be implemented as a microprocessor implementing functions of a central processing unit (CPU) on an integrated circuit. The CPU is a logic machine executing a computer program 122, which comprises the program instructions 104. The instructions 104 may be coded as a computer program using a programming language, which may be a high-level programming language, such as C, or Java, or a low-level programming language, such as a machine language, or an assembler. The CPU may comprise a set of registers 604, an arithmetic logic unit (ALU) 606, and a control unit (CU) 608. The control unit 608 is controlled by a sequence of instructions 104 transferred to the CPU from the working memory 102. The control unit 608 may contain a number of microinstructions for basic operations. The implementation of the microinstructions may vary, depending on the CPU design. The microprocessor 106 may also have an operating system (a dedicated operating system of an embedded system, or a real-time operating system), which may provide the computer program 122 with system services.

In an example embodiment, there may be three different types of buses between the working memory 102 and the processor 106: a data bus 610, a control bus 612, and an address bus 614. The control unit 608 uses the control bus 612 to set the working memory 102 in two states, one for writing data into the working memory 102, and the other for reading data from the working memory 102. The control unit 608 uses the address bus 614 to send to the working memory 102 address signals for addressing specified portions of the memory in writing and reading states. The data bus 610 is used to transfer data 622, such as data 140A, 140B, 140C, 140D, 142, 144, from the working memory 102 to the processor 106 and from the processor 106 to the working memory 102, and to transfer the instructions 104 from the working memory 102 to the processor 106. During running of the program 122, the instructions 104 are transferred via the data bus 610 from the working memory 102 into the control unit 608, wherein usually a portion of the instructions 104 resides and controls the operation of the apparatus 100.

In an example embodiment, the working memory 102 may be implemented as a random-access memory (RAM), where the information is lost after the power is switched off. The RAM is capable of returning any piece of data in a constant time, regardless of its physical location and whether or not it is related to the previous piece of data. The data may comprise data 140A, 140B, 140C, 140D, 142, 144 and any other permanent or temporary data needed during the processing, program instructions etc.

In an example embodiment, the non-volatile memory 600 retains the stored information even when not powered. Examples of non-volatile memory include read-only memory (ROM), flash memory, magnetic computer storage devices such as hard disk drives, and optical discs. As is shown in FIG. 6, the non-volatile memory 600 may store both data 620 and the computer program 122 comprising the instructions 104.

An example embodiment provides a computer program 122 comprising the instructions 104 which, when loaded 126 into the apparatus 100, cause the apparatus 100 to obtain data 140A, 140B, 140C, 140D relating to the subscriber identity modules 110, 112, 114, 116, obtain data 142 relating to a mobile terminal, obtain at least one selection ground 144 for the subscriber identity module, and select at least one optimal subscriber identity module 110, 112, 114, 116 for use by the mobile terminal on the basis of the data 140A, 140B, 140C, 140D relating to the subscriber identity modules, the data 142 relating to the mobile terminal, and the at least one selection ground 144 for the subscriber identity module.

In an example embodiment, the computer program 122 may be in source code form, object code form, or in some intermediate form. The computer program 122 may be stored in a carrier 120, which may be any entity or device capable of carrying the program 122 to the apparatus 100. The carrier 120 may be a computer-readable storage medium. Besides this, the carrier 120 may be implemented as follows, for example: the computer program 122 may be embodied on a record medium, stored in a computer memory, embodied in a read-only memory, carried on an electrical carrier signal, carried on a telecommunications signal, and/or embodied on a software distribution medium. In some jurisdictions, depending on the legislation and the patent practice, the carrier 120 may not be the telecommunications signal. The medium 120 may be a non-transitory computer-readable storage medium.

FIG. 1 illustrates an example embodiment in which the carrier 120 may be coupled 126 with the apparatus 100, whereupon the program 122 comprising the instructions 104 is transferred into the (working) memory 102, and possibly also into the non-volatile memory 600. The program 122 with its instructions 104 may be loaded from the non-volatile memory 600 into the working memory 102 as needed.

There are many ways to structure the program 122. In an example embodiment, the operations of the program may be divided into functional modules, sub-routines, methods, classes, objects, applets, macros, etc., depending on the software design methodology and the programming language used. In modern programming environments, there are software libraries, i.e. compilations of ready-made functions, which may be utilized by the program for performing a wide variety of standard operations.

Figure 2:
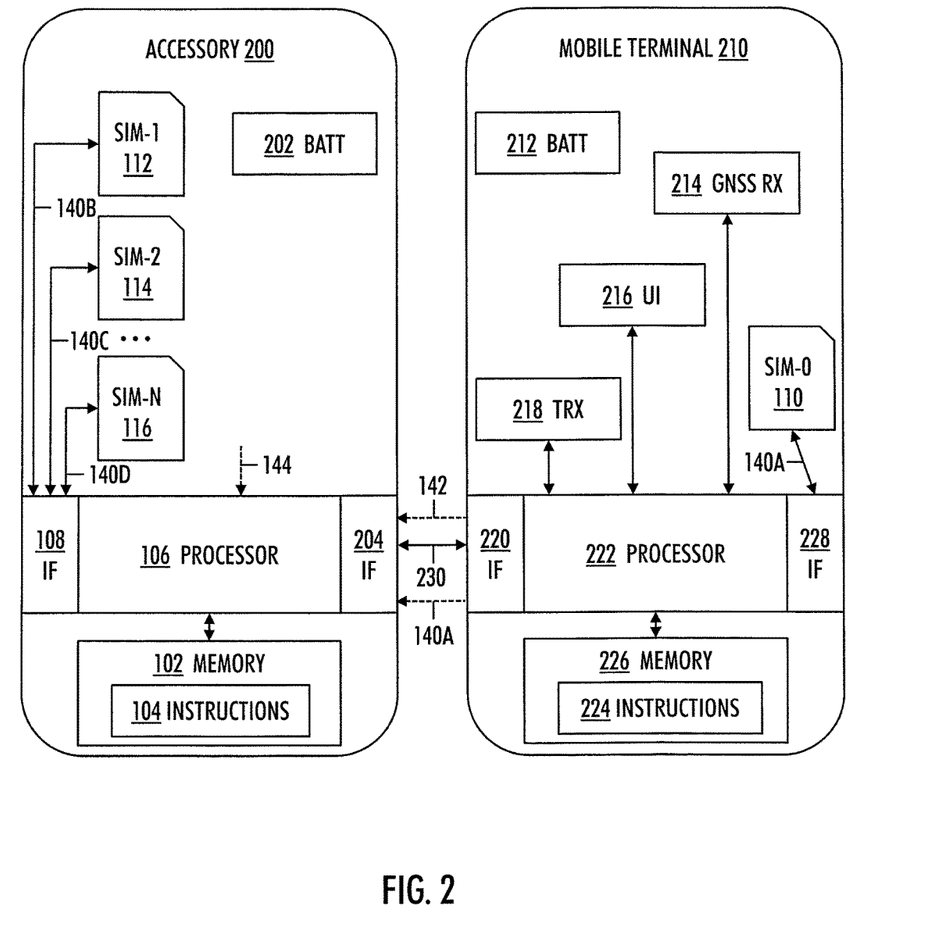

FIG. 2 illustrates an example embodiment wherein the apparatus 100 functionality is implemented in an accessory 200 of a mobile terminal 210. Consequently, the accessory 200 comprises the set of the subscriber identity modules 112, 114, 116, and the at least one processor 106 and at least one memory 102 with the instructions 104.

The accessory 200 may or may not comprise a battery 202, depending on the power requirements of the accessory 200 and the possibility to obtain electric energy from an external source such as the mobile terminal 210. The (rechargeable) electrical battery 202 is one or more electro-chemical cells that convert stored chemical energy into electrical energy. Instead of battery 202, other suitable accumulator means may be used to store energy.

The interface 108 to the subscriber identity modules 110, 112, 114, 116 is within the accessory 200, but also another interface 228 to the subscriber identity module 110 possibly located in the mobile terminal 210 may be needed.

Furthermore, both the mobile terminal 210 and the accessory 200 comprise a wired/wireless standard/proprietary communication protocol interface 204, 220 enabling two-way communication 230 between the mobile terminal 210 and the accessory 200. In an example embodiment, the interface 204, 220 is implemented as a serial or parallel communication bus, hardware line, an USB (Universal Serial Bus) cable with appropriate connectors, a SIM bus according to ISO/IEC 7816-3, a wireless Bluetooth link, a wireless WLAN (Wireless Local Area Network) link, a wireless Wi-Fi (Wireless Fidelity) link, a serial bus such as UART (Universal Asynchronous Receiver/Transmitter), I$^2$C (Inter-Integrated Circuit) or SPI (System Packet Interface). The data 140A relating to the subscriber identity module 110 and the data 142 relating to the mobile terminal 210 may be transferred from the mobile terminal 210 to the accessory 200 through the interfaces 204, 220.

The instructions 104, when executed by the one or more processors 106 of the accessory 200, cause the accessory 200 to obtain the data 140A, 140B, 140C, 140D relating to the subscriber identity modules 110, 112, 114, 116, obtain the data 142 relating to the mobile terminal 210, obtain at least one selection ground 144 for the subscriber identity module, and select at least one optimal subscriber identity module 110, 112, 114, 116 for use by the mobile terminal 210 on the basis of the data 140A, 140B, 140C, 140D relating to the subscriber identity modules, the data 142 relating to the mobile terminal 210, and the at least one selection ground 144 for the subscriber identity module.

In an example embodiment, the mobile terminal 210 may be a mobile wireless communications terminal employing a transceiver 218 capable of communicating with a wireless communication system, such as 702 illustrated in FIG. 7. In an example embodiment, the mobile terminal 210 may be a mobile phone comprising the default subscriber identity module 110, a user interface 216, a battery 212, at least one processor 222 and at least one memory 226 with instructions 224.

The user interface 216 may comprise a display, means for producing sound, a keyboard, and/or a keypad, for example. The display may be a liquid crystal display, for example, but it may also be implemented by any appropriate prior art technique, such as with an active-matrix organic light-emitting diode. The display may also incorporate other user interaction means, such as touch input, or haptic feedback, i.e. the display may be a touch screen. The means for producing sound may be a loudspeaker or a simpler means for producing beeps or other sound signals. The keyboard/keypad may comprise a complete (QWERTY) keyboard, a mere numeric keypad or only a few push buttons and/or rotary buttons. In addition, the user interface 216 may comprise other user interface elements, for example various means for focusing a cursor (mouse, track ball, various arrow keys, touch sensitive area etc.) or elements enabling audio control. A parameter, setting or command relating to the described processing of the subscriber identity modules 110, 112, 114, 116 may be manipulated with the user interface 216.

Furthermore, the mobile terminal 210 may comprise a positioning receiver 214 receiving external location information, which may be utilized to generate location of the mobile terminal 210. The positioning receiver 214 may be a receiver of a global navigation satellite system (GNSS). Such a system may be the Global Positioning System (GPS), the Global Navigation Satellite System (GLONASS), the Galileo Positioning System (Galileo), the Beidou Navigation System, The Quasi-Zenith Satellite System (QZSS), or the Indian Regional Navigational Satellite System (IRNSS), for example. The positioning receiver 214 determines its location (longitude, latitude, and altitude) using signals transmitted from satellites orbiting the earth. Besides global navigation satellites, the positioning receiver 214 may also determine its location by utilizing other known positioning techniques. It is well known that by receiving radio signals from several different base stations, a mobile phone may determine its location, for example.

In the example embodiment of FIG. 2, the accessory 200 does not comprise a user interface of its own, but the user interaction is performed through the user interface 216 of the mobile terminal 210 as data may be transferred between the accessory 200 and the mobile terminal 210 through the interfaces 204, 220. However, in another example embodiment, the accessory 200 may comprise a user interface as well for outputting and/or inputting data relating to the described processing of the subscriber identity modules 110, 112, 114, 116.

In the example embodiment of FIG. 2, the apparatus 100 functionality may be implemented in the accessory 200 such that the instructions 104 are run in the at least one processor 106 of the accessory 200. However, also such an example embodiment is feasible wherein a part of the apparatus 100 functionality is implemented in the mobile terminal 210 as well such that a part of the instructions 104 are also run in the at least one processor 222 of the mobile terminal 210.

Figure 3:
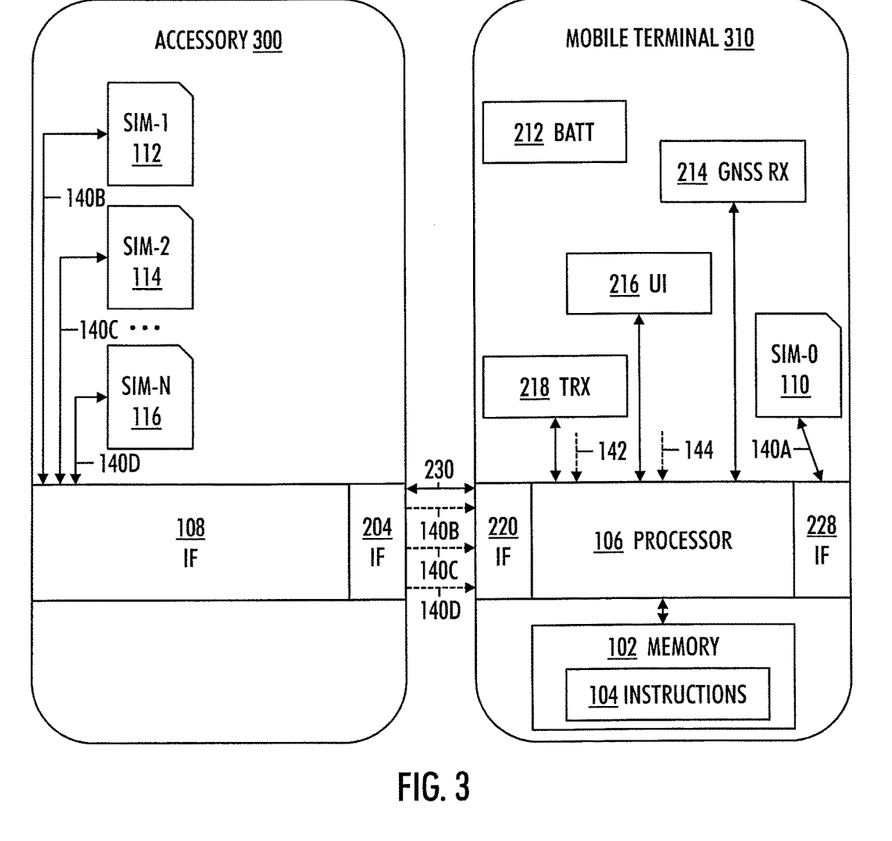

FIG. 3 illustrates an example embodiment wherein the apparatus 100 functionality is divided between an accessory 300 of a mobile terminal 310 and the mobile terminal 310. Consequently, the accessory 200 comprises the set of the subscriber identity modules 112, 114, 116. The interface 108 to the subscriber identity modules 110, 112, 114, 116 is within the accessory 200, but also another interface 228 to the subscriber identity module 110 possibly located in the mobile terminal 210 may be needed. But, as shown in FIG. 3, the accessory 300 does not require a processor or a memory.

The mobile terminal 310 comprises the at least one processor 106 and at least one memory 102 with the instructions 104, and also the other parts 110, 212, 214, 216, 218, 220, 228 as shown in FIG. 3, and explained in relation to FIG. 2.

In the example embodiment of FIG. 3, the accessory 300 is a kind of container including the extra subscriber identity modules 112, 114, 116 to be used by the mobile terminal 310, but the required processing is performed only in the at least one processor 106 of the mobile terminal 310.

The data 140B, 140C, 140D relating to the subscriber identity modules 112, 114, 116 may be transferred from the accessory 300 to the mobile terminal 310 through the interfaces 204, 220.

The instructions 104, when executed by the one or more processors 106 of the mobile terminal 310, cause the mobile terminal 310 to obtain the data 140A, 140B, 140C, 140D relating to the subscriber identity modules 110, 112, 114, 116, obtain the data 142 relating to the mobile terminal 210, obtain at least one selection ground 144 for the subscriber identity module, and select at least one optimal subscriber identity module 110, 112, 114, 116 for use by the mobile terminal 210 on the basis of the data 140A, 140B, 140C, 140D relating to the subscriber identity modules, the data 142 relating to the mobile terminal 210, and the at least one selection ground 144 for the subscriber identity module.

Figure 4:
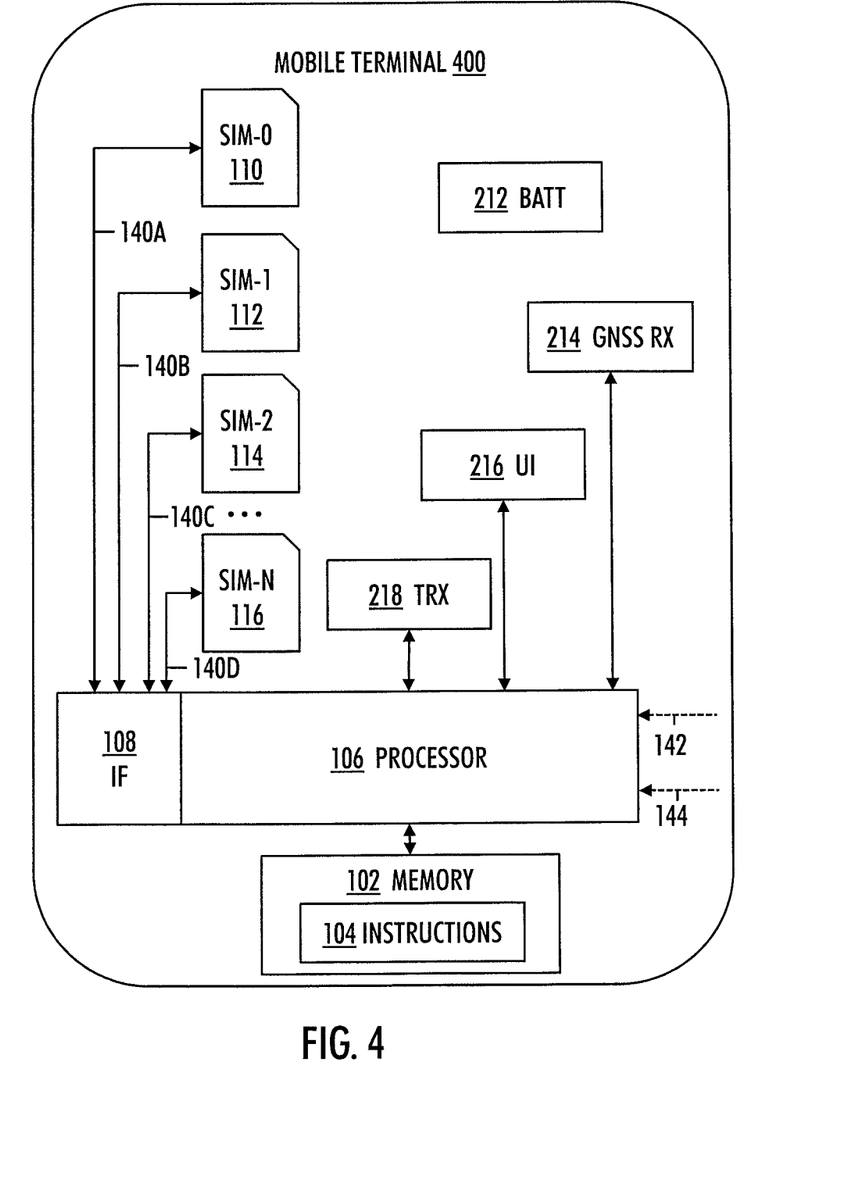

FIG. 4 illustrates an example embodiment wherein the apparatus 100 functionality is implemented to a mobile terminal 400. Consequently, the mobile terminal 400 comprises the interface 108 to the set of the subscriber identity modules 110, 112, 114, 116 of the wireless communication system, the one or more processors 106, and the one or more memories 102 storing the instructions 104. The instructions 104, when executed by the one or more processors 106, cause the mobile terminal 400 to obtain data 140A, 140B, 140C, 140D relating to the subscriber identity modules 110, 112, 114, 116 through the interface 108, obtain data 142 relating to the mobile terminal 400, obtain at least one selection ground 144 for the subscriber identity module, and select at least one optimal subscriber identity module for use by the mobile terminal 400 on the basis of the data 140A, 140B, 140C, 140D relating to the subscriber identity modules 110, 112, 114, 116, the data 142 relating to the mobile terminal 400, and the at least one selection ground 144 for the subscriber identity module. The mobile terminal 400 may also comprise at least some of the other parts 212, 214, 216, 218 as shown in FIG. 4, and explained in relation to FIG. 2.

Figure 5:
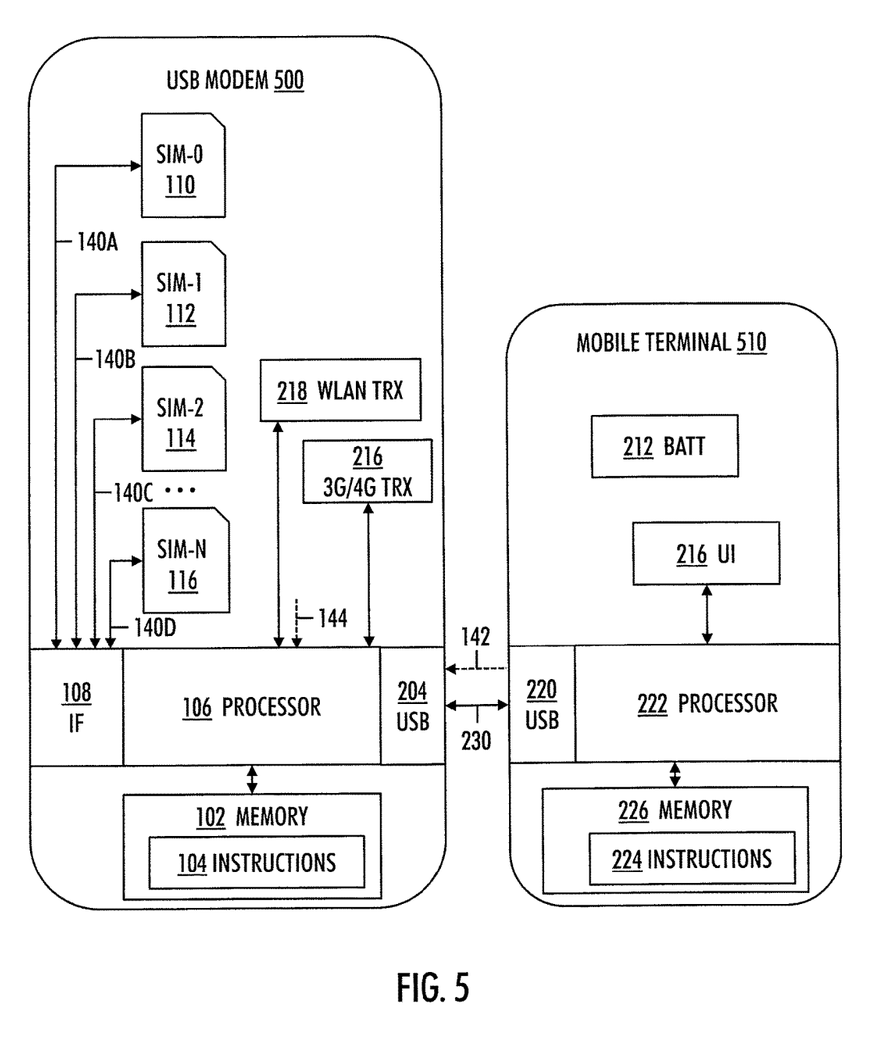

FIG. 5 illustrates an example embodiment wherein the apparatus 100 functionality is implemented in a USB (Universal Serial Bus) modem 500. Consequently, the USB modem 500 comprises the set of the subscriber identity modules 110, 112, 114, 116, the interface 108 to the subscriber identity modules 110, 112, 114, 116, the at least one processor 106, and at least one memory 102 with the instructions 104.

The USB modem 500 may or may not comprise a battery, depending on the power requirements of the USB modem 500 and the possibility to obtain electric energy from an external source such as a mobile terminal 510.

Furthermore, the USB modem 500 comprises a USB interface 204 capable of being coupled 230 through a USB cable and appropriate connectors to a USB interface 220 of the mobile terminal 510. The data 142 relating to the mobile terminal 510 may be transferred from the mobile terminal 510 to the USB modem 500 through the interfaces 204, 220.

The instructions 104, when executed by the one or more processors 106 of the USB modem 500, cause the USB modem 500 to obtain the data 140A, 140B, 140C, 140D relating to the subscriber identity modules 110, 112, 114, 116, obtain the data 142 relating to the mobile terminal 510, obtain at least one selection ground 144 for the subscriber identity module, and select at least one optimal subscriber identity module 110, 112, 114, 116 for use by the mobile terminal 510 on the basis of the data 140A, 140B, 140C, 140D relating to the subscriber identity modules, the data 142 relating to the mobile terminal 510, and the at least one selection ground 144 for the subscriber identity module.

In an example embodiment, the mobile terminal 510 may be a portable computer, a tablet computer, or any other suitable mobile terminal capable of employing the set of subscriber identity modules 110, 112, 114, 116, but not necessarily itself including a transceiver capable of communicating with a wireless communication system, such as 702 illustrated in FIG. 7. Consequently, the mobile terminal 510 may only comprise the battery 212 and the user interface 216 of the other parts of the mobile terminal 210 illustrated in FIG. 2.

In the example embodiment of FIG. 5, the apparatus 100 functionality may be implemented in the USB modem 500 such that the instructions 104 are run in the at least one processor 106 of the USB modem 500. However, also such an example embodiment is feasible wherein a part of the apparatus 100 functionality is implemented in the mobile terminal 510 as well such that a part of the instructions 104 are also run in at least one processor 222 of the mobile terminal 510 besides the other instructions 224 stored in at least one memory 226 of the mobile terminal 510.

Figure 8:
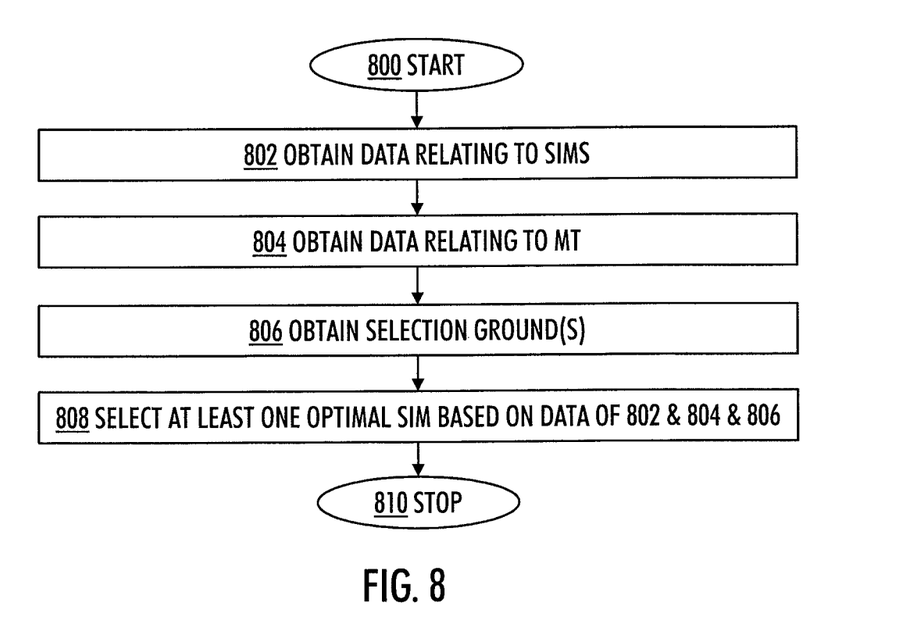
FIG. 8 illustrates example embodiments of a method.

Next, example embodiments of a method will be described with reference to FIG. 8. Other functions, not described in this application, may also be executed between the operations or within the operations. Some of the operations or parts of the operations may also be left out or replaced by a corresponding operation or part of the operation. The method starts in 800. In 802, data relating to subscriber identity modules of a wireless communication system is obtained. In 804, data relating to a mobile terminal is obtained. In 806, at least one selection ground for the subscriber identity module is obtained. It is to be noted that the sequence of operations 802, 804, 806 may differ from what is shown, and they may also be executed at least partly in parallel. In 808 at least one optimal subscriber identity module for use by the mobile terminal is selected on the basis of the data relating to the subscriber identity modules, the data relating to the mobile terminal, and the at least one selection ground for the subscriber identity module. The method ends in 810.

The embodiments of the earlier described apparatus 100 may also be used to enhance the method. In an example embodiment, the method may be implemented in an electronic apparatus 100 described earlier. In an embodiment, a computer program comprises instructions which, when loaded into an apparatus 100, cause the apparatus 100 to perform the described process. In an embodiment, a computer-readable storage medium comprises the computer program.

Next, further example embodiments of the method will be described. These example embodiments may be freely combined with each other in order to produce further example embodiments.

In an example embodiment, obtaining 802 the data relating to the subscriber identity modules comprises at least one of the following: reading the data from the subscriber identity modules; receiving the data wirelessly from a service provider; receiving the data from a user interface manipulated by a user of the mobile terminal.

In an example embodiment, obtaining 804 the data relating to the mobile terminal comprises at least one of the following: obtaining location of the mobile terminal; obtaining country code from the mobile terminal; obtaining time from the mobile terminal; obtaining date from the mobile terminal; obtaining day of the week from the mobile terminal; obtaining information of available operators from the mobile terminal, obtaining information of available networks from the mobile terminal; obtaining type of the mobile terminal; obtaining model of the mobile terminal; obtaining info about applications in use or used in the mobile terminal.

In an example embodiment, obtaining 806 the at least one selection ground for the subscriber identity module comprises at least one of the following: obtaining network coverage criterion; obtaining available services criterion; obtaining quality of service criterion; obtaining costs of using the subscriber identity module criterion; obtaining location of the mobile terminal criterion.

In an example embodiment, the method further comprises: treating one of the subscriber identity modules as the default subscriber identity module; and using the default subscriber identity module after start-up of the mobile terminal.

In an example embodiment, the method further comprises: detecting roaming of the mobile terminal; and initiating said selection of the at least one optimal subscriber identity module for use by the mobile terminal.

In an example embodiment, the method further comprises: detecting if the default subscriber identity module is taken out of the use and instead at least one more optimal subscriber identity module is taken into use, and, in such a case, switching on a call forwarding from the default subscriber identity module to one of the more optimal subscriber identity modules taken into use.

In an example embodiment, the method further comprises: performing said selection of the at least one optimal subscriber identity module for use by the mobile terminal in two stages, by pre-selecting subscriber identity modules that are usable on the basis of the data relating to the subscriber identity modules and the data relating to the mobile terminal, and by selecting at least one subscriber identity module for use by the mobile terminal from among the pre-selected subscriber identity modules on the basis of the at least one selection ground.

The present invention is applicable to apparatuses defined above but also to other suitable apparatuses. The protocols used, the specifications of wireless communication systems, and the apparatuses develop rapidly. Such development may require extra changes to the described example embodiments. Therefore, all words and expressions should be interpreted broadly and they are intended to illustrate, not to restrict, the example embodiments. It will be obvious to a person skilled in the art that, as technology advances, the inventive concept can be implemented in various ways. The invention and its embodiments are not limited to the examples described above but may vary within the scope of the claims.

The invention claimed is:

1. An accessory of a mobile wireless communications terminal comprising:
   an interface to a set of subscriber identity modules (SIMs) of a wireless communication system stored in at least one removable physical SIM card;
   a battery of the accessory;
   a communication protocol interface enabling two-way communication between the accessory and the mobile wireless communications terminal as the accessory and the mobile wireless communications terminal are two separate apparatuses in their own housings, the two-way communication between the accessory and the mobile wireless communications terminal being wireless;
   one or more processors, and
   one or more memories configured to store instructions, that, when executed by the one or more processors, cause the accessory to:
   obtain data relating to the set of subscriber identity modules through the interface;
   obtain data relating to the mobile wireless communications terminal;
   obtain at least one selection ground for selecting at least one of the set of subscriber identity modules;
   obtain the data relating to the set of subscriber identity modules by receiving the data wirelessly from a service provider, wherein the service provider is an operator-independent supplier or vendor of the at least one removable physical SIM card storing subscriber identity modules obtained from at least two mobile network operators and the accessory, wherein the data relating to the set of subscriber identity modules comprises more than one of the following: a unique serial number of the SIM card, internationally unique number of the subscriber, security authentication and ciphering information for the subscriber, temporary information related to the local network, a list of the services the subscriber has access to, an operator-specific emergency number, two passwords, other carrier-specific data such as a short message service center, service provider name, service dialing numbers, advice-of-charge parameters, and value added service applications; and select at least one optimal subscriber identity module for use by the mobile wireless communications terminal on the basis of the data relating to the set of subscriber identity modules, the data relating to the mobile wireless communications terminal, and the at least one selection ground for the set of subscriber identity modules, such that the at least one selection ground defines a required service according to an available services criterion, a quality of service criterion, a price paid for the required service, and a location of the mobile wireless communications terminal using the required service.

2. The accessory of claim 1, wherein the one or more memories further store instructions, that, when executed by the one or more processors, cause the accessory to obtain the data relating to the mobile wireless communications terminal by at least one of the following:
   obtain location of the mobile wireless communications terminal;
   obtain country code from the mobile wireless communications terminal;
   obtain time from the mobile wireless communications terminal;
   obtain date from the mobile wireless communications terminal;
   obtain day of the week from the mobile wireless communications terminal;
   obtain information of available operators from the mobile wireless communications terminal;
   obtain information of available networks from the mobile wireless communications terminal;
   obtain type of the mobile wireless communications terminal;
   obtain model of the mobile wireless communications terminal;
   obtain info about applications in use or used in the mobile wireless communications terminal.

3. The accessory of claim 1, wherein the one or more memories further store instructions, that, when executed by the one or more processors, cause the accessory to treat one of the set of subscriber identity modules as a default subscriber identity module and to use the default subscriber identity module after start-up of the mobile wireless communications terminal.

4. The accessory of claim 3, wherein the one or more memories further store instructions, that, when executed by the one or more processors, cause the accessory to detect roaming of the mobile wireless communications terminal, and to initiate said selection of the at least one optimal subscriber identity module for use by the mobile wireless communications terminal.

5. The accessory of claim 4, wherein the one or more memories further store instructions, that, when executed by the one or more processors, cause the accessory to detect if the default subscriber identity module is taken out of the use and instead at least one more optimal subscriber identity module is taken into use, in which case the accessory is caused to switch on a call forwarding from the default subscriber identity module to one of the more optimal subscriber identity modules taken into use.

6. The accessory of claim 1, wherein the one or more memories further store instructions, that, when executed by the one or more processors, cause the accessory to perform said selection of the at least one optimal subscriber identity module for use by the mobile wireless communications terminal in two stages, by pre-selecting subscriber identity modules that are usable on the basis of the data relating to the subscriber identity modules and the data relating to the mobile wireless communications terminal, and by selecting at least one subscriber identity module for use by the mobile wireless communications terminal from among the pre-selected subscriber identity modules on the basis of the at least one selection ground.

7. The accessory of claim 1, wherein the one or more memories further store instructions that, when executed by the one or more processors, cause the accessory to obtain the data relating to the subscriber identity modules by at least one of the following:
   read the data from the subscriber identity modules;
   receive the data from a user interface manipulated by a user of the mobile wireless communications terminal.

8. The accessory of claim 1, wherein the one or more memories further store instructions that, when executed by the one or more processors, cause the accessory to obtain the at least one selection ground for the subscriber identity modules also by the following:
   obtain network coverage criterion.

9. A method comprising:
   obtaining data relating to subscriber identity modules (SIMs) of a wireless communication system;
   obtaining data relating to a mobile wireless communications terminal;
   obtaining at least one selection ground for the subscriber identity modules;
   wherein the method is performed in an accessory of the mobile wireless communications terminal comprising an interface to a set of subscriber identity modules of a wireless communication system stored in at least one removable physical SIM card, the accessory having a battery and a communication protocol interface enabling two-way wireless communication between the accessory and the mobile communications terminal as the accessory and the mobile communications terminal are two separate apparatuses in their own housings;
   obtaining the data relating to the subscriber identity modules by receiving the data wirelessly from a service provider, wherein the service provider is an operator-independent supplier or vendor of the at least one removable physical SIM card storing subscriber identity modules obtained from at least two mobile network operators and the accessory, wherein the data relating to the subscriber identity modules comprises more than one of the following: a unique serial number of the SIM card, internationally unique number of the subscriber, security authentication and ciphering information for the subscriber, temporary information related to the local network, a list of the services the subscriber has access to, an operator-specific emergency number, two passwords, other carrier-specific data such as a short message service center, service provider name, service dialing numbers, advice-of-charge parameters, and value added service applications; and
   selecting at least one optimal subscriber identity module for use by the mobile wireless communications terminal on the basis of the data relating to the subscriber identity modules, the data relating to the mobile wireless communications terminal, and the at least one selection ground for the subscriber identity modules, such that the at least one selection ground defines a required service according to an available services criterion, a quality of service criterion, a price paid for the required service, and a location of the mobile wireless communications terminal using the required service.

10. The method of claim 9, wherein obtaining the data relating to the mobile wireless communications terminal comprises at least one of the following:
    obtaining location of the mobile wireless communications terminal;
    obtaining country code from the mobile wireless communications terminal;
    obtaining time from the mobile wireless communications terminal;
    obtaining date from the mobile wireless communications terminal;
    obtaining day of the week from the mobile wireless communications terminal;
    obtaining information of available operators from the mobile wireless communications terminal;
    obtaining information of available networks from the mobile wireless communications terminal;
    obtaining type of the mobile wireless communications terminal;
    obtaining model of the mobile wireless communications terminal;
    obtaining info about applications in use or used in the mobile wireless communications terminal.

11. The method of claim 9, further comprising:
    treating one of the subscriber identity modules as a default subscriber identity module; and using the default subscriber identity module after start-up of the mobile wireless communications terminal.

12. The method of claim 11, further comprising:
    detecting roaming of the mobile wireless communications terminal; and
    initiating said selection of the at least one optimal subscriber identity module for use by the mobile wireless communications terminal.

13. The method of claim 12, further comprising:
    detecting if the default subscriber identity module is taken out of the use and instead at least one more optimal subscriber identity module is taken into use, and, in such a case, switching on call forwarding from the default subscriber identity module to one of the more optimal subscriber identity modules taken into use.

14. The method of any claim 10, further comprising:
    performing said selection of the at least one optimal subscriber identity module for use by the mobile wireless communications terminal in two stages, by preselecting subscriber identity modules that are usable on the basis of the data relating to the subscriber identity modules and the data relating to the mobile wireless communications terminal, and by selecting at least one subscriber identity module for use by the mobile wireless communications terminal from among the preselected subscriber identity modules on the basis of the at least one selection ground.

15. The method of claim 9, wherein obtaining the data relating to the subscriber identity modules comprises at least one of the following:
    reading the data from the subscriber identity modules;
    receiving the data from a user interface manipulated by a user of the mobile wireless communications terminal.

16. The method of claim 9, wherein obtaining at least one selection ground for the subscriber identity modules further comprises the following:
    obtaining network coverage criterion.

17. A computer program on a non-transitory computer-readable storage medium comprising instructions which, when loaded into an accessory of a mobile wireless communications terminal, cause the accessory to perform the process of:
    obtaining data relating to subscriber identity modules (SIMs) of a wireless communication system;
    obtaining data relating to the mobile wireless communications terminal;
    obtaining at least one selection ground for the subscriber identity modules;
    wherein the accessory comprises an interface to a set of the subscriber identity modules of a wireless communication system stored in at least one removable physical SIM card, the accessory having a battery and a communication protocol interface enabling two-way wireless communication between the accessory and the mobile communications terminal as the accessory and the mobile communications terminal are two separate apparatuses in their own housings;
    obtaining the data relating to the subscriber identity modules by receiving the data wirelessly from a service provider, wherein the service provider is an operator-independent supplier or vendor of the at least one removable physical SIM card storing subscriber identity modules obtained from at least two mobile network operators and the accessory, wherein the data relating to the subscriber identity modules comprises more than one of the following: a unique serial number of the SIM card, internationally unique number of the subscriber, security authentication and ciphering information for the subscriber, temporary information related to the local network, a list of the services the subscriber has access to, an operator-specific emergency number, two passwords, other carrier-specific data such as a short message service center, service provider name, service dialing numbers, advice-of-charge parameters, and value added service applications; and
    selecting at least one optimal subscriber identity module for use by the mobile wireless communications terminal on the basis of the data relating to the subscriber identity modules, the data relating to the mobile wireless communications terminal, and the at least one selection ground for the subscriber identity modules, such that the at least one selection ground defines a required service according to an available services criterion, a quality of service criterion, a price paid for the required service and a location of the mobile wireless communications terminal using the required service.

* * * * *